United States Patent
Jin et al.

(10) Patent No.: US 10,320,008 B2
(45) Date of Patent: Jun. 11, 2019

(54) POROUS SEPARATOR FOR FUEL CELL

(71) Applicants: Hyundai Motor Company, Seoul (KR); Kia Motors Corporation, Seoul (KR)

(72) Inventors: Sang Mun Jin, Gyeonggi-do (KR); Kook Il Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 489 days.

(21) Appl. No.: 15/085,375

(22) Filed: Mar. 30, 2016

(65) Prior Publication Data
US 2016/0344044 A1 Nov. 24, 2016

(30) Foreign Application Priority Data
May 18, 2015 (KR) .................. 10-2015-0069072

(51) Int. Cl.
*H01M 8/04* (2016.01)
*H01M 8/0258* (2016.01)
(Continued)

(52) U.S. Cl.
CPC ......... *H01M 8/0258* (2013.01); *H01M 8/023* (2013.01); *H01M 8/026* (2013.01);
(Continued)

(58) Field of Classification Search
CPC .. H01M 8/0258; H01M 8/023; H01M 8/0245; H01M 8/0254; H01M 8/026; H01M 8/0267; H01M 2250/20
See application file for complete search history.

(56) References Cited

U.S. PATENT DOCUMENTS

2005/0164071 A1   7/2005   Horiguchl
2013/0065156 A1   3/2013   Jeong
(Continued)

FOREIGN PATENT DOCUMENTS

JP   2007-200751 A   8/2007
JP   2012-048825 A   3/2012
(Continued)

OTHER PUBLICATIONS

European Search Report for European Patent Application No. 16165115.3, dated Aug. 30, 2016, 18 pages.

*Primary Examiner* — Raymond Alejandro
(74) *Attorney, Agent, or Firm* — Mintz Levin Cohn Ferris Glovsky and Popeo, P.C.; Peter F. Corless

(57) ABSTRACT

A porous separator for a fuel cell is provided and features the shape of a passage aperture formed in a flow field plate. The modified shape of the passage aperture minimizes destruction of a gas diffusion layer or a membrane electrode assembly attributable to stress concentration. The porous separator has a flow field plate that includes a first contact portion that is in contact with a gas diffusion layer or a membrane electrode assembly; a second contact portion that is in contact with a coolant channel; and a connection portion that is connected between the first contact portion and the second contact portion. Additionally, a passage aperture is formed in the connection portion, wherein a portion of an inside surface of the passage aperture protrudes toward a center of the passage aperture.

10 Claims, 10 Drawing Sheets

(51) Int. Cl.
*H01M 8/023* (2016.01)
*H01M 8/0245* (2016.01)
*H01M 8/0254* (2016.01)
*H01M 8/0267* (2016.01)
*H01M 8/026* (2016.01)

(52) U.S. Cl.
CPC ....... *H01M 8/0245* (2013.01); *H01M 8/0254* (2013.01); *H01M 8/0267* (2013.01); *H01M 2250/20* (2013.01)

(56) References Cited

U.S. PATENT DOCUMENTS

| | | |
|---|---|---|
| 2013/0149633 A1 | 6/2013 | Jeong |
| 2015/0010840 A1 | 1/2015 | Roshanzamir |

FOREIGN PATENT DOCUMENTS

| | | | | |
|---|---|---|---|---|
| JP | 2012-124019 | * | 6/2012 | ............. H01M 8/02 |
| JP | 2012-124019 A | | 6/2012 | |
| JP | 2013-229294 A | | 11/2013 | |
| JP | 2015-022813 A | | 2/2015 | |
| KR | 2012-0048056 A | | 5/2012 | |
| KR | 2013-0066795 A | | 6/2013 | |

* cited by examiner

POROUS SEPARATOR FOR FUEL CELL

CROSS REFERENCE TO RELATED APPLICATION

The present application claims priority of Korean Patent Application Number 10-2015-0069072 filed on May 18, 2015, the entire contents of which application is incorporated herein for all purposes by this reference.

BACKGROUND

Field of the Invention

The present invention relates to a porous separator for a fuel cell and, more particularly, to a porous separator for a fuel cell in which the porous separator has a modified passage aperture, thereby minimizing destruction of a gas diffusion layer or membrane electrode assembly, the destruction being attributable to stress concentration.

Description of the Related Art

A fuel cell stack for a vehicle includes a plurality of cells connected to each other. Fuel and coolant are supplied from one side of the fuel cell stack and discharged from the opposite side. In each cell of the fuel cell stack, separators are arranged on respective principal surfaces of a membrane electrode assembly (MEA) covered by gas diffusion layers. Cells having the above-described structure are stacked in series to form a fuel cell stack.

Further, an MEA is an electrolyte membrane covered by an air electrode and a fuel electrode allowing a reaction between hydrogen and oxygen to occur. The MEA is disposed in the center of a cell of a fuel cell stack. Gas diffusion layers are stacked on outer surfaces of the air electrode and the fuel electrode. In addition, separators, each with a flow field that allows fuel to be introduced into the cell through it or allows water produced through a hydrogen-oxygen reaction to be discharged through it, are arranged extraneous to the respective gas diffusion layers in which gaskets are interposed between the gas diffusion layers and the separators.

The separator is typically structured such that lands that are in tight contact with the gas diffusion layer and channels (flow fields) that serve as a flow channel of a fluid are arranged alternately. Since the lands and channels (flow fields) are arranged alternatively and are both meandering, the channels in one surface of a separator that faces the gas diffusion layer are used to allow a reaction gas such as hydrogen or air to pass therethrough and the channels in the opposite surface of the separator are used to allow coolant to pass therethrough.

In a fuel cell stack, an oxidation reaction of hydrogen progresses in a fuel electrode which produces protons and electrons. The produced hydrogen ions and electrons move to an air electrode through an electrolyte membrane and a separator. Thus, the hydrogen ions and electrons that are supplied from the fuel electrode and oxygen existing in air undergo an electrochemical reaction in an air electrode. This reaction produces water and electric energy, and at this time the flow of electrons produces electrical energy.

According to this structure, since channels serving as flow field for reaction and gas and coolant are formed by stacking a separator for an anode and a separator for a cathode on each other, the structure of a unit cell of a fuel cell stack is simplified. However, the unevenness of the surface of the separators attributable to channels and lands formed in the separators leads to a lack of uniformity in surface pressure, which results in an increase in electric resistance and immoderate stress concentration around the lands. This results in destruction of a gas diffusion layer and deterioration of diffusivity of a reaction gas.

When a structure with fine pores such as metal/carbon foam or wire mesh is inserted into a reaction surface instead of a conventional flow field having a channel shape, movement of a reaction gas and water becomes easier. Furthermore, a gas diffusion layer is uniformly compressed to distribute surface pressure, thereby minimizing electric resistance and maximizing performance of a fuel cell. However, existing flow field structures with fine pores have disadvantages of high manufacturing cost and increased weight and volume compared to conventional flow field structures. Therefore, mass-productivity of the flow field structures is deteriorated.

FIG. 1 illustrates a conventional porous separator according to the related art. The conventional porous separator has a plurality of passage apertures 43 formed in inclined surfaces (e.g., on a side sloped surface thereof) of a flow field plate 40. The passage apertures are arranged at regular intervals in a longitudinal direction (e.g., gas flow direction) of the flow field plate 40. Since concave and convex structures are repeatedly arranged in the longitudinal direction, fuel may be smoothly diffused in a reaction surface of the flow field plate 40. Particularly, since a flow rate of a reaction gas greatly increases under high current conditions in which fuel consumption is high, flow resistance increases due to the concave and convex structures in a porous plate. In other words, the effect of the porous plate is maximized.

Furthermore, a reaction gas that passes through a passage aperture formed in a one-side inclined surface of the flow field plate is stopped by the opposite-side inclined surface (e.g., the slopes are of opposite inclines or angles). Therefore, the reaction gas flows in the widthwise direction of the flow field plate to move to an adjacent aperture in a next channel. Since the reaction gas flows along a zigzag path, diffusivity of the reaction gas is increased. A micro porous flow field is disposed to be adjacent to a gas diffusion layer in a cell. A reaction gas that is introduced through the porous flow field passes through the gas diffusion layer and reaches an MEA whereby a reaction occurs.

The gas diffusion layer is a micro porous layer that is a conglomerate of carbon fiber. To facilitate diffusion of a reaction gas and discharge of water produced through a chemical reaction, it is necessary to minimize destruction of a micro porous structure in a gas diffusion layer, the destruction being attributable to coupling force of cells of a fuel cell stack. On the other hand, since the micro porous flow field is also used as a transmission path for electricity generated through a chemical reaction as well as a flow path for a reaction gas, it is desirable to minimize contact resistance in an interface surface by increasing the coupling force of cells of a fuel cell stack.

However, as illustrated in FIGS. 2 and 3, due to a structural characteristic of a porous body in which passage apertures are formed in inclined surfaces, a cut portion of a passage aperture 43 is in contact with the gas diffusion layer (GDL) and stress is concentrated at the contact area. For this reason, carbon fiber that forms the gas diffusion layer is destroyed. In other words, since the cut surface of a passage aperture comes into tight contact with the gas diffusion layer due to the structural characteristic of a porous body and the tight contact causes stress concentration, excessive destruction of the gas diffusion layer occurs. Thus, deterioration is caused in diffusivity of a reaction gas and water discharge performance and physical damage to a membrane electrode assembly.

The foregoing is intended merely to aid in the understanding of the background of the present invention, and is not intended to mean that the present invention falls within the purview of the related art that is already known to those skilled in the art.

SUMMARY

Accordingly, the present invention provides a porous separator for a fuel cell having a modified passage aperture to prevent destruction of a gas diffusion layer or a membrane electrode assembly, the destruction being attributable to stress concentration.

According to one aspect, a porous separator for a fuel cell having a flow field plate may include: a first contact portion in contact with a gas diffusion layer or a membrane electrode assembly; a second contact portion in contact with a coolant channel; a connection portion connected between the first contact portion and the second contact portion; and a passage aperture formed in the connection portion, wherein a portion of an inside surface of the passage aperture protrudes toward a center of the passage aperture.

When an imaginary centerline that extends in a longitudinal direction of the passage aperture is drawn to pass opposing midway points of the passage aperture in a widthwise direction of the passage aperture, the protruding portion may protrude toward the imaginary centerline from a portion of a first inside surface of the passage aperture. The protruding portion may be formed on the first inside surface of the passage aperture that is closer to the first contact portion than the second contact portion. The protruding portion that protrudes from the first inside surface of the passage aperture may not reach or may not extend over the imaginary centerline of the passage aperture. The protruding portion may be formed in a middle portion of the first inside surface of the passage aperture. The protruding portion may be formed to extend over a full length of the first inside surface of the passage aperture.

Further, the protruding portion may be in surface contact with an outer surface of the gas diffusion layer or the membrane electrode assembly. The protruding portion may be formed to extend toward the gas diffusion layer or the membrane electrode assembly and to be bent at a predetermined inclination angle (e.g., on a slope) with respect to an imaginary plane where the protruding portion is flush with the gas diffusion layer or the membrane electrode assembly. The predetermined inclination angle between the protruding portion and the imaginary plane may be in a range of from about 1° to 45°.

Additionally, bending stiffness of the protruding portion may be weaker than compressive stiffness of the gas diffusion layer and the membrane electrode assembly, and thus, the protruding portion is bent by pressing force of the gas diffusion layer or the membrane electrode assembly in a direction in which the predetermined inclination angle with respect to the imaginary line is decreased when a fuel cell stack is assembled and thus finally the protruding portion comes into surface contact with the outer surface of the gas diffusion layer or the membrane electrode assembly.

An end portion of the protruding portion may be formed to rise toward a coolant channel from an outer surface of the gas diffusion layer or the membrane electrode assembly, and thus, a retention space for retaining water therein may be formed in a portion thereof connected to the first contact portion and the connection portion. An end of the protruding portion may be connected to the first contact portion and the opposite end of the protruding portion may be formed to extend in the same direction as the connection portion that is formed to rise toward the second contact portion. The protruding portion may be formed in a second inside surface of the passage aperture that is closer to the second contact portion than the first contact portion.

According to the porous separator for a fuel cell according to an exemplary embodiment of the present invention, the protruding portion formed in a passage aperture may prevent stress concentration on the gas diffusion layer or the membrane electrode assembly, thereby minimizing structural destruction of the gas diffusion layer or the membrane electrode assembly and increasing diffusivity of a reaction gas. In addition, it may be possible to minimize a physical damage to the gas diffusion layer or the membrane electrode assembly by alleviating stress concentration on a reaction surface. In other words, it may be possible to improve durability of a fuel cell stack.

When assembling a fuel cell stack, the protruding portion may be bent such that the surface of the gas diffusion layer or the membrane electrode assembly is flush with the surface of the protruding portion. Therefore, the porous separator may consistently maintain elastic force after the fuel cell stack is completely assembled, resulting in a decrease in surface pressure attributable to the fuel cell stack being operated for a long duration.

In addition, since the protruding portion is curved to conform to the profile of the flow field plate, it may be possible to prevent stress from being excessively concentrated. Since a retention space for retaining condensate water in the fuel cell stack due to the curved shape of the flow field plate, it may be further possible to improve water drain performance during low-temperature operation of fuel cells and prevent drying-out during high-temperature operation of fuel cells. Furthermore, it may be possible to increase heat transfer in a fuel cell stack by increasing a contact area where coolant and flow field come into contact with each other, using the protruding portion. For this reason, it may be possible to improve operation performance and durability of a fuel cell stack.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described below with reference to the accompanying drawings.

Figure 1:
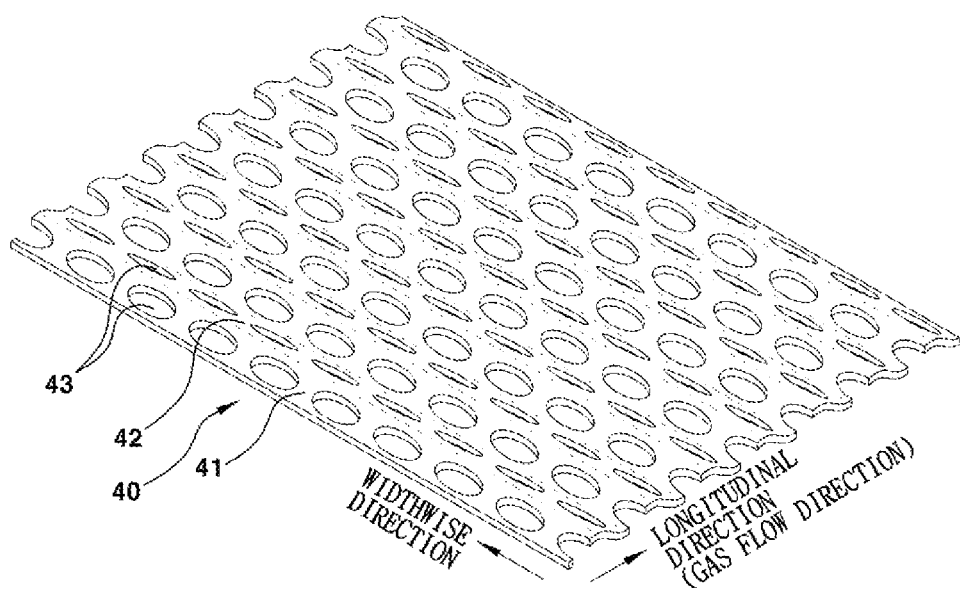
FIG. 1 is a perspective view of a porous separator according to a related art.
Figure 2:
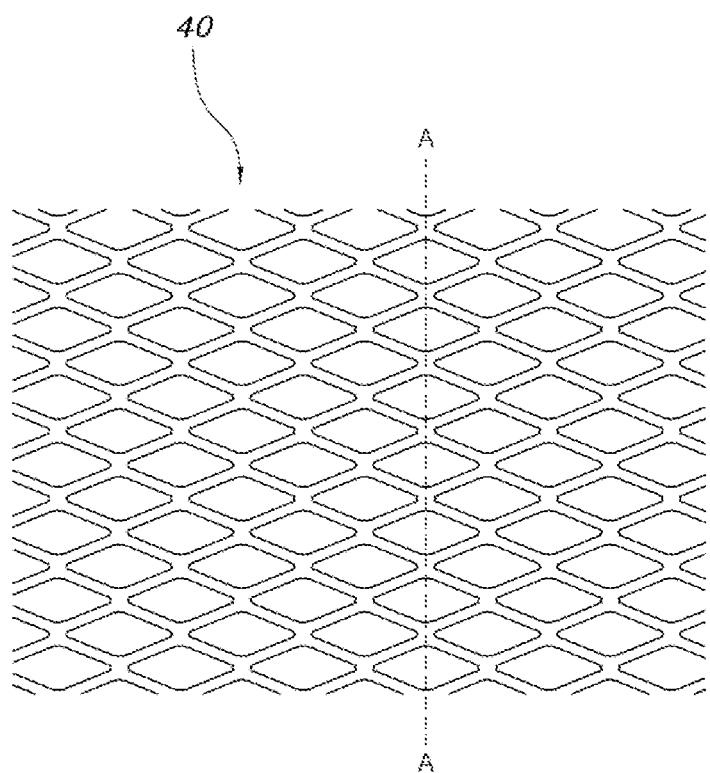
FIG. 2 is a plan view of the porous separator according to the related art.
Figure 3:
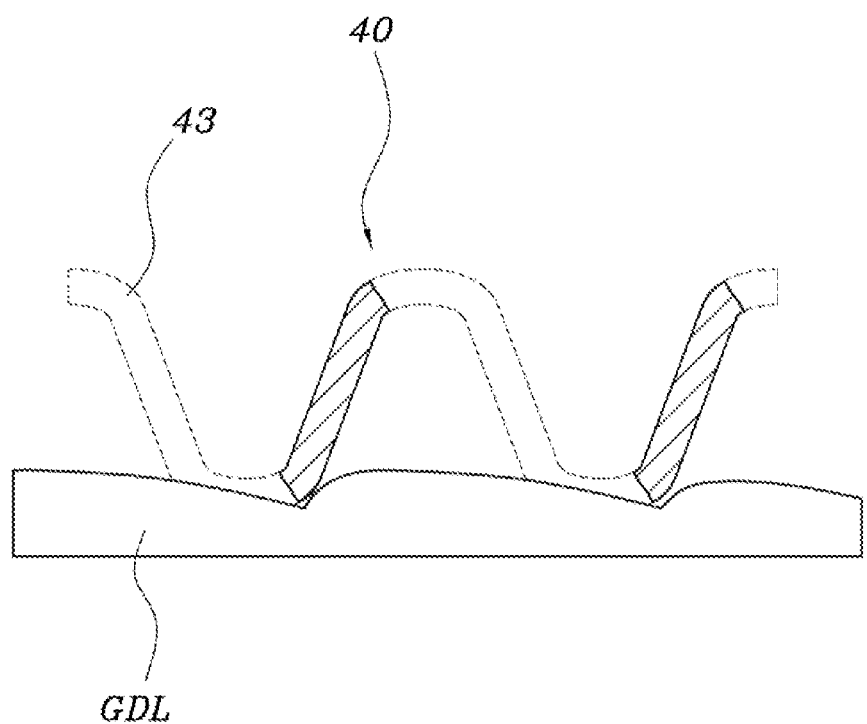
FIG. 3 is a cross-sectional view taken along a line A-A of FIG. 2 according to the related art.
Figure 4:
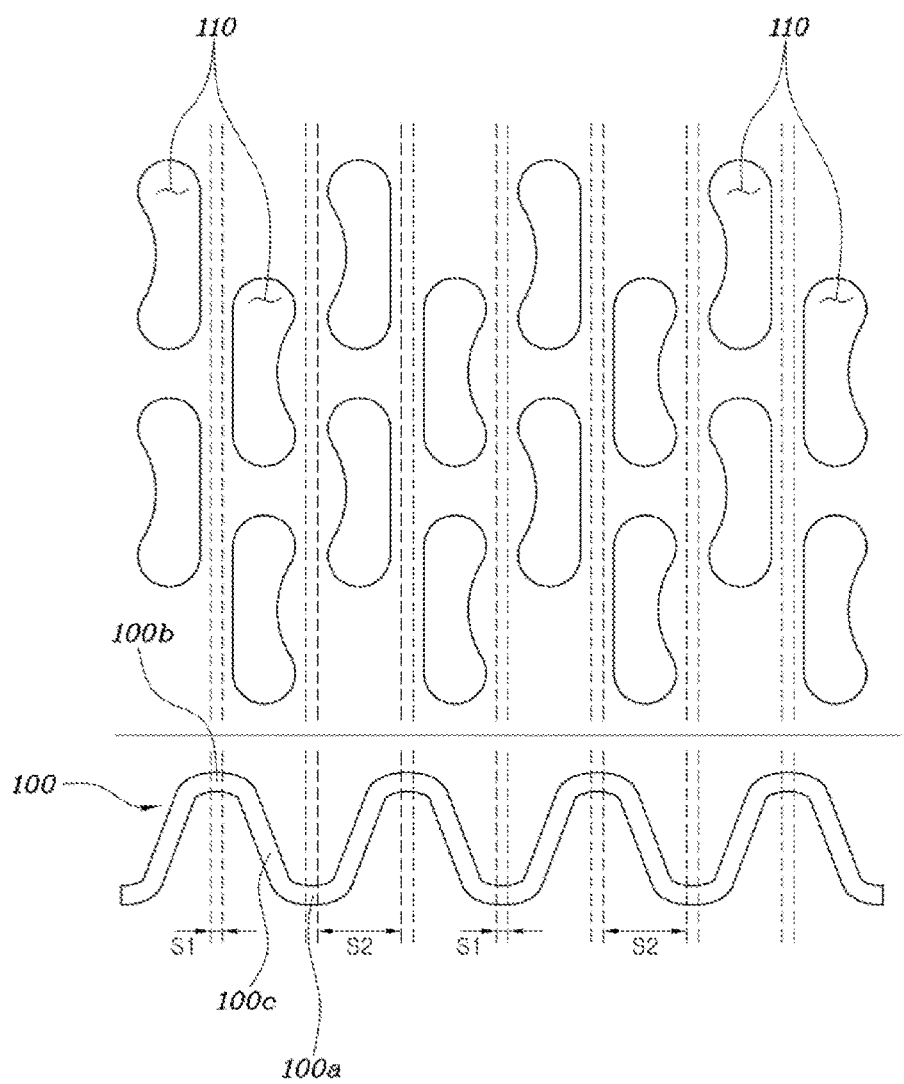
FIG. 4 is a cross-sectional view illustrating a flow field plate that forms a porous separator according to one exemplary embodiment of the present invention and illustrating the shape of a passage aperture.

The present invention features a structure in which an inside surface of a passage aperture 110 formed in a flow field plate 100 may protrude toward the center of the passage aperture 110. With reference to FIG. 4, a porous separator according to one exemplary embodiment of the present invention may include a flow field plate 100 and a flat plate 200.

A first surface of the flow field plate 100 faces a gas diffusion layer 300 or an outer surface of a membrane electrode assembly 400. The first surface may be in tight contact (e.g., abut) with the gas diffusion layer 300 or the membrane electrode assembly 400. When a cell includes the gas diffusion layer 300, the flow field plate 100 may be in tight contact (e.g., abut) with the gas diffusion layer 300. However, when a cell does not include the gas diffusion layer 300, the flow field plate 100 may not be in tight contact (e.g., may not abut) with the membrane electrode assembly 400. A second surface of the flow field plate 100 faces an inner surface of the flat plate 200. The second surface of the flow field plate 100 may be in tight contact with the inner surface of the flat plate 200. In particular, a coolant channel 210 may be formed in an outer surface of the flat plate 200.

In the flow field plate 100, a first contact portion 100a that comes into contact with the gas diffusion layer 300 or the membrane electrode assembly 400 and a second contact portion 100b that comes into contact with the coolant channel 210 may be connected to a connection portion 100c. In the flow field plate 100, the first contact portion 100a, the connection portion 100c, and the second contact portion 100b may be arranged in this order along the longitudinal direction of the flow field plate 100 to form a concave-and-convex structure. The concave-and-convex structures may be arranged in the longitudinal direction of the flow field plate 100. The first contact portion 100a and the second contact portion 100b arranged in the longitudinal direction of the flow field plate 100 may be disposed alternately in contact with the gas diffusion layer 300 (or the membrane electrode assembly 400) and the coolant channel 210.

As illustrated in FIG. 4, each of the first contact portion 100a and the second contact portion 100b may be a first section S1 disposed in a boundary area between two neighboring connection portions 100c or may be a boundary area between two neighboring connection portions 100c. The connection portion 100c may be a second section S2 disposed between the first contact portion 100a and the second contact portion 100b. The passage aperture 110 may be formed on the connection portion 100c. In particular, the passage aperture 110 may be formed not to extend up to the first contact portion 100a or second contact portion 100b. A plurality of passage apertures 110 may be arranged at regular intervals in a widthwise direction of the flow field plate 100. Each passage aperture 110 may be circle, oval, or rectangular. The passage apertures 110 may be arranged in a zigzag pattern.

In other words, when the passage apertures 110 are arranged in multiple rows, for example, each connection portion 110c may be formed in between passage apertures 110 in a first row, passage apertures 110 in a second row may be formed in the corresponding positions of the connection portions 110c formed in the first row. Based on the above-described arrangement of the passage apertures, a reaction gas may pass through the passage apertures 110 in a row and then may move in the widthwise direction, thereby flowing into the passage apertures 100 in a next row.

Particularly, a portion of an inside surface of each passage aperture 110 may protrude toward the center of the passage aperture 110. In other words, when there is an imaginary passage aperture center line CL that extends in a longitudinal direction of the passage aperture 110 and passes the opposing midway points of the passage aperture 110 in a widthwise direction of the passage aperture 110, a portion of an inside surface of the passage aperture 110 may protrude inward (e.g., toward the centerline CL of the passage aperture 110). The portion that protrudes inward in the passage aperture 110 may be referral to as a protruding portion 120. Each passage aperture 110 may include the protruding portion 120. The protruding portion 120 may be formed on a portion of the inside surface of the passage aperture 110 that is relatively close (e.g., proximate) to the first contact portion 100a, i.e., to the gas diffusion layer 300 or the membrane electrode assembly 400 when the fuel cell stack is assembled.

According to above-described structure, since a surface of the protruding portion that protrudes toward the centerline of the passage aperture 110 may be in close contact with (e.g., abut) an outer surface of the gas diffusion layer 300 or the membrane electrode assembly 400, it may be possible to minimize an area where a cut portion that is the inside surface of the passage aperture 110 is in contact with the gas diffusion layer 300 or the membrane electrode assembly 400. Therefore, the flow field plate 100 may be prevented from causing stress concentration on the gas diffusion layer 300 or the membrane electrode assembly 400. It may therefore be possible to minimize structural destruction of the gas diffusion layer 300 or the membrane electrode assembly 400, thereby improving diffusivity of a reaction gas and alleviating excessive stress concentration on a reaction surface. As a result, it may be possible to minimize a physical damage to the gas diffusion layer 300 or the membrane electrode assembly 400, resulting in an improvement in durability of a fuel cell stack.

Figure 5:
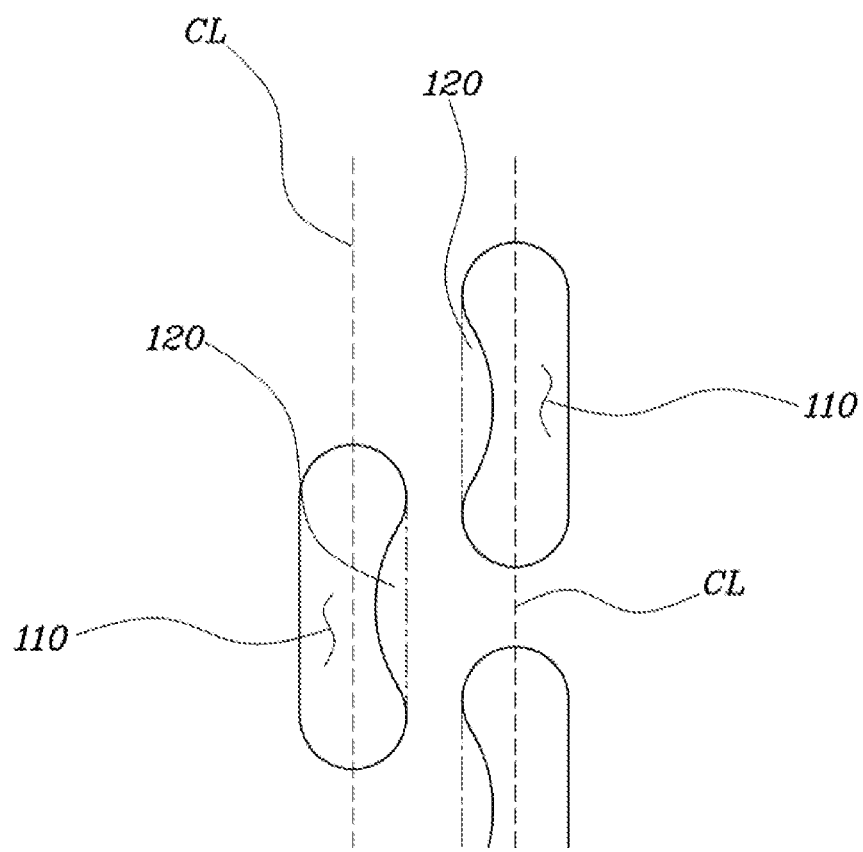
FIG. 5 is a view illustrating a protruding portion formed in the passage aperture according to a first exemplary embodiment of the present invention.

Moreover, the protruding portion 120 may be formed not to reach or extend over the centerline CL of the flow line. As illustrated in FIG. 5, the protruding portion 120 may be formed in a middle portion of an inside surface of the passage aperture 110 in a longitudinal direction of the passage aperture. In other words, the protruding portion 120 may be formed in the middle portion of the passage aperture 110 where stress is may be highly concentrated.

Figure 6:
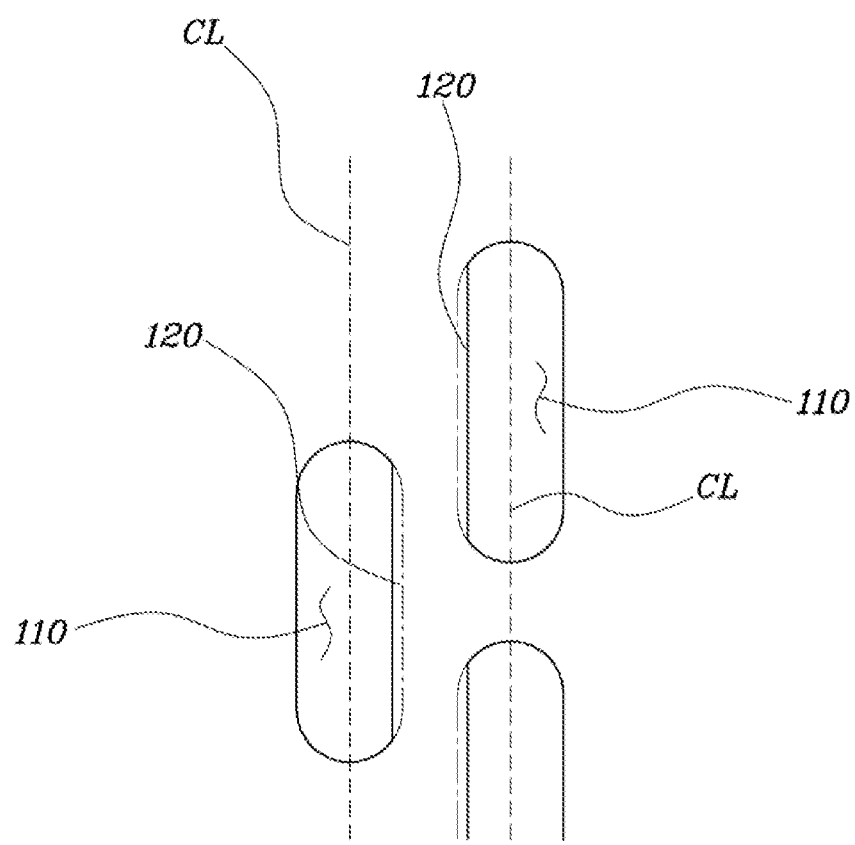
FIG. 6 is a view illustrating a protruding portion formed in the passage aperture according to a second exemplary embodiment of the present invention.

Alternatively, as illustrated in FIG. 6, the protruding portion 120 may be formed on a one-side inside surface of the passage aperture 110, which is close to (e.g., proximate to) the first contact portion 100a, to extend over the full length of the passage aperture 110. The protruding portion 120 illustrated in FIG. 6 has an advantage of simplifying the shape of the passage aperture 110 as well as preventing stress concentration like the protruding portion 120 illustrated in FIG. 5. According to this structure, manufacturability of a flow field plate may be improved.

Figure 7:
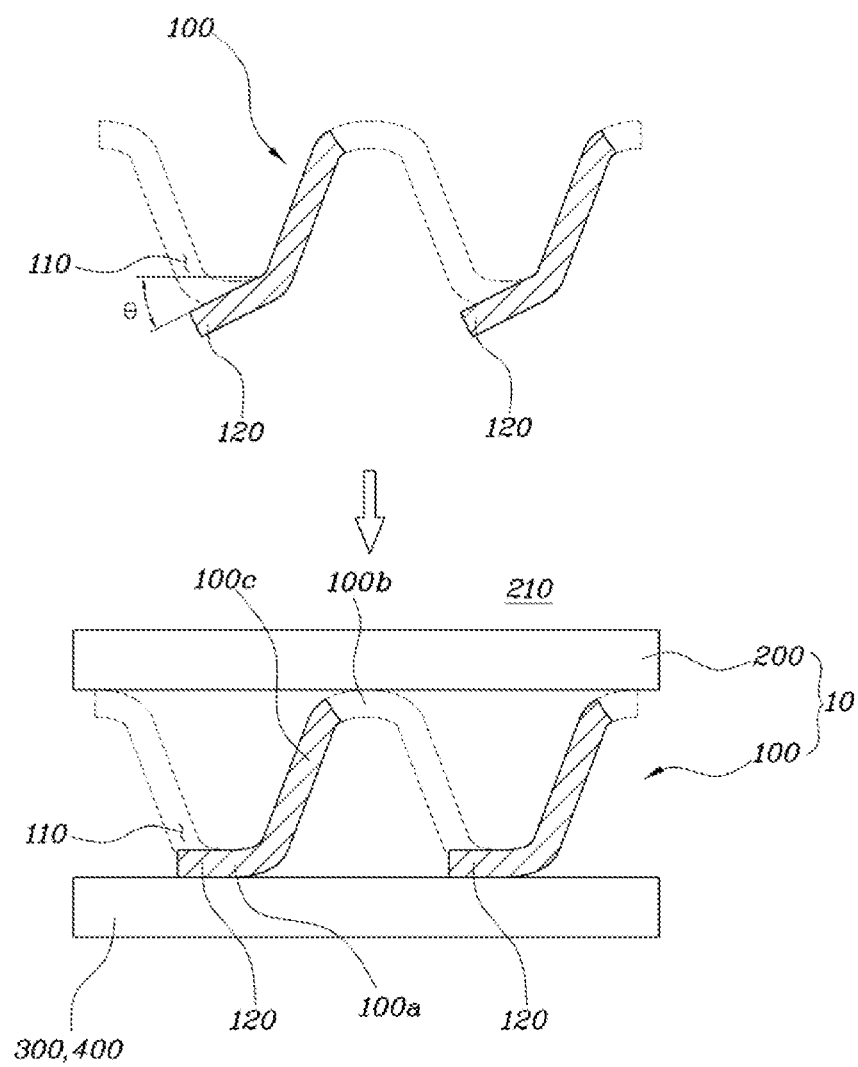
FIG. 7 is a schematic view illustrating a cross section of a protruding portion according to one exemplary embodiment when a flow field plate is assembled.

With reference to FIG. 7, the protruding portion 120 may be formed to be in surface contact with an outer surface of the gas diffusion layer 300 or the membrane electrode assembly 400 to allow the protruding portion 120 to be flush with the gas diffusion layer 300 or the membrane electrode assembly 400. The protruding portion 120 may be formed to be flush with the gas diffusion layer 300 or the membrane electrode assembly 400 in a process in which the flow field plate 100 is processed. Alternatively, the protruding portion 120 may be flush with the gas diffusion layer 300 or the membrane electrode assembly 400 by being bent by the gas diffusion layer 300 or the membrane electrode assembly 400 in a process in which the fuel cell stack is assembled.

As illustrated in an upper portion of FIG. 7, the protruding portion 120 may be bent at a predetermined inclination angle (e.g., a predetermined slope) toward the gas diffusion layer 300 or the membrane electrode assembly 400 with respect to an imaginary plane where the protruding portion 120 is flush with the gas diffusion layer 300 or the membrane electrode assembly 400. The predetermined angle between the protruding portion 120 and the imaginary plane may be about 1° to 45°. When the inclination angle is greater than about 45°, the protruding portion 120 may protrude or extend into and thus rupture the gas diffusion layer 300 or the membrane electrode assembly 400 before it is bent, due to the elastic force thereof while a fuel cell stack is assembled.

Additionally, the protruding portion 120 may have bending stiffness weaker than compressive stiffness of the gas diffusion layer 300 or the membrane electrode assembly 140 and thus, the protruding portion 120 may be bent while a fuel cell stack is assembled. Therefore, as illustrated in a lower portion of FIG. 7, when a fuel cell stack is assembly, the protruding portion 120 may be bent in a direction in which the inclination angle between the protruding portion 120 and the imaginary plane is decreased by the pressing force of the gas diffusion layer 300 or the membrane electrode assembly 400, thereby coming into surface contact with the outer surface of the gas diffusion layer 300 or the membrane electrode assembly 400. Finally, the protruding portion may become flush with the gas diffusion layer 300 or the membrane electrode assembly 400.

Figure 8:
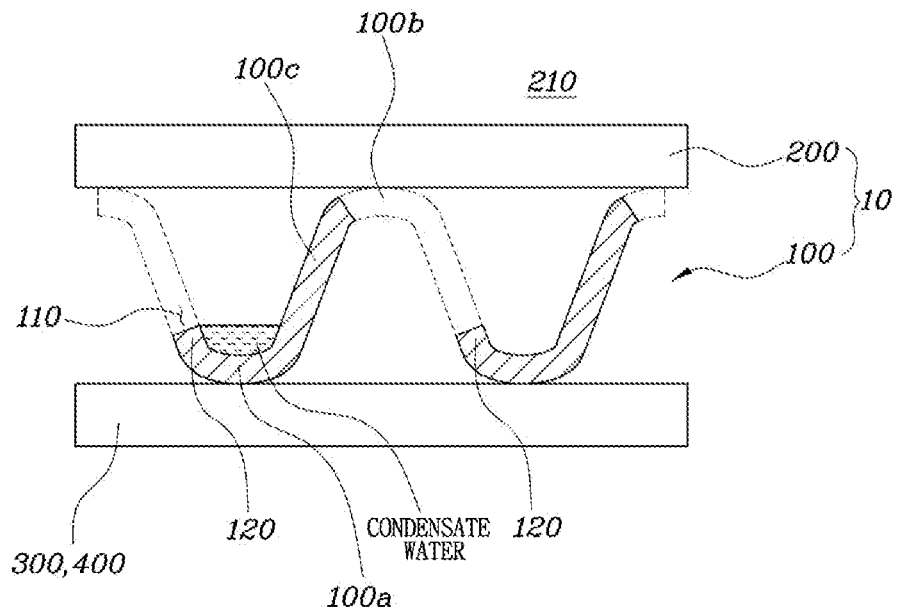
FIG. 8 is a schematic view illustrating a cross section of a protruding portion according to another exemplary embodiment a flow field plate is assembled.

Since the porous separator 10 may consistently maintain elastic force even after a fuel cell stack is assembled, it may be possible to prevent a decrease in surface pressure that occurs when a fuel cell stack is operated for a long period of time, thereby improving durability of a fuel cell stack. In addition, as illustrated in FIG. 8, an end portion of the protruding portion 120 may be formed to be lifted from the gas diffusion layer 300 or the membrane electrode assembly 400 toward the coolant channel 210. Therefore, the protruding portion 120 may provide a retention space for retaining water between the first contact portion 100a and the connection portion 100c. An end of the protruding portion 120 may be connected to the first contact portion 100a and the opposite end of the protruding portion 120 may be formed in the same direction as the connection portion 100c formed to rise toward the second contact portion 100b.

Figure 9:
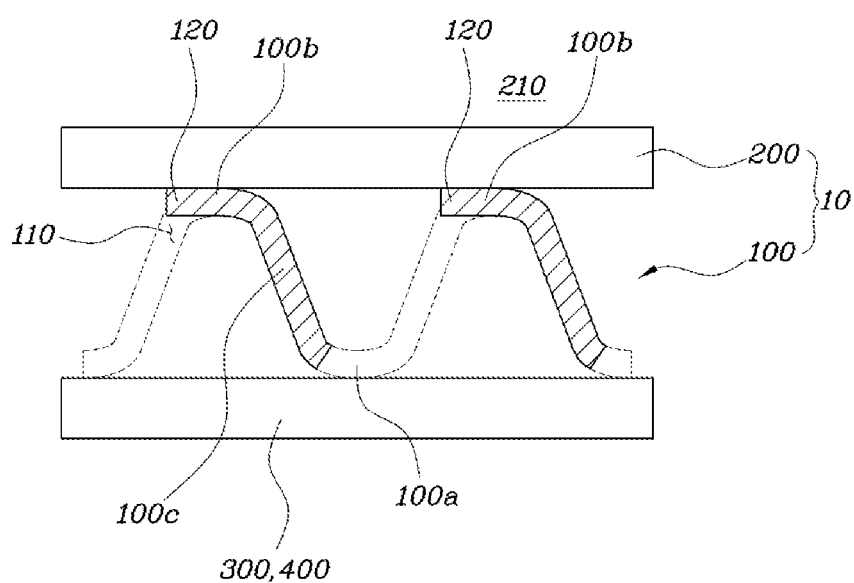
FIG. 9 is a view illustrating a structure in which the protruding portion comes into contact with a flow field for coolant when a flow field plate is assembled according to an exemplary embodiment of the present invention.
Figure 10A:
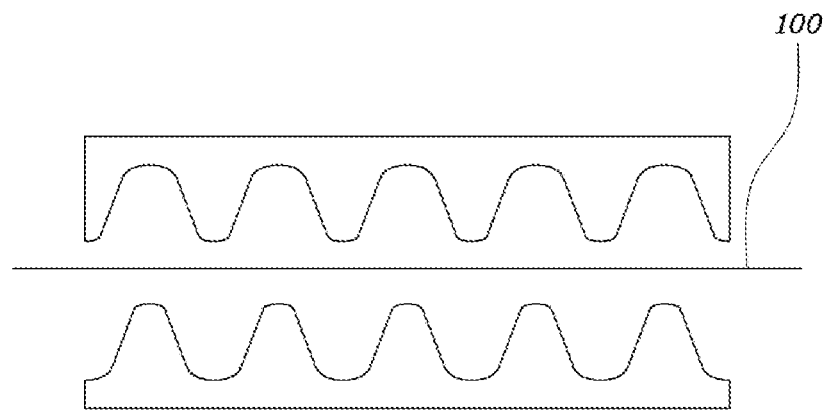
FIGS. 10A to 10C are views illustrating an apparatus for manufacturing a flow field plate according to one exemplary embodiment of the present invention.
Figure 10B:
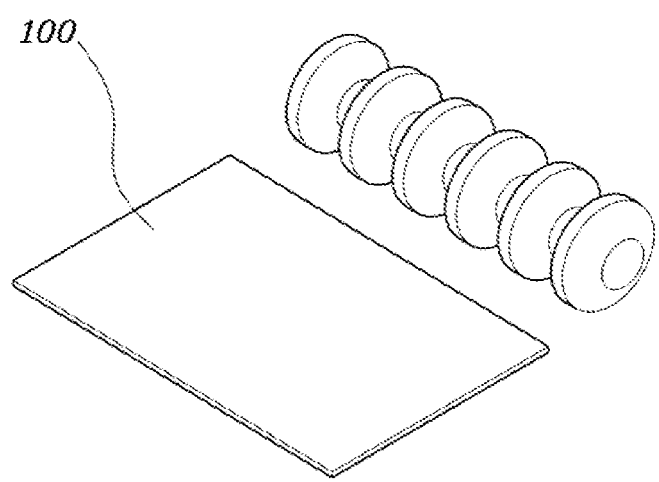
Figure 10C:
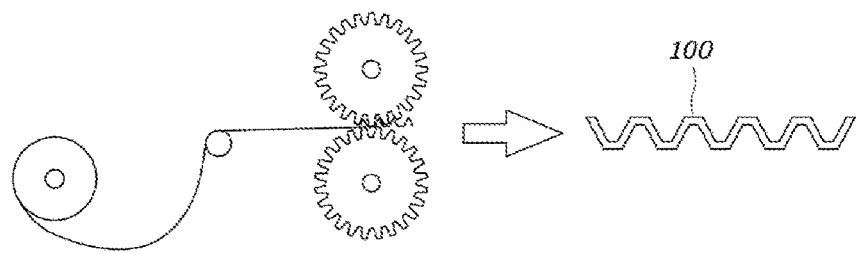

Even though the protruding portion 120 may be formed to be curved along with the curve of the flow field plate 100 to thus be in contact with the gas diffusion layer 300, it may be possible to provide a retention space for coolant in a fuel cell stack by using the curved portion as well as to prevent excessive stress concentration. Therefore, it may be possible to improve water drain during a low temperature operation of fuel cells and to prevent drying out of a fuel cell stack during a high temperature operation of fuel cells. In addition, with reference to FIG. 9, the protruding portion 120 that protrudes toward the centerline CL of the passage aperture from a portion of an inside surface of the passage aperture, may be formed on the inside surface that is relatively close to (e.g., proximate to) the second contact portion, i.e., the flat plate 200.

The second surface of the field flow plate 100 that is opposite to the first surface in contact with the gas diffusion layer 300 or the membrane electrode assembly 400, may be a portion in contact with the coolant channel 210 for discharging heat generated through a chemical reaction. By increasing a contact area in this portion, it may be possible to improve internal heat transfer of fuel cells and performance and durability of a fuel cell stack. This structure is more advantageous in a condition in which a heat transfer problem is severe, for example, in a high temperature operation condition.

As illustrated in FIGS. 10A, 10B, 10C, and 10D, the shapes of various passage apertures suggested by the exemplary embodiments of the invention may be easily reproduced and formed through a perforating process or an etching process, thus facilitating a mass-production of the plates.

As described above, since the protruding portion that protrudes toward the centerline of the passage aperture 110 from one inside surface of the passage aperture 110 may abut the outer surface of the gas diffusion layer 300 or the membrane electrode assembly 400, it may be possible to minimize an area where a cut portion, which is a portion of the inside surface of the gas flow passage 110, is in contact with the gas diffusion layer 300 or the membrane electrode assembly 400. Therefore, it may be possible to prevent stress concentration on the gas diffusion layer 300 or the membrane electrode assembly 400. As a result, it may be possible to minimize structural destruction of the gas diffusion layer 300 or the membrane electrode assembly 400, thereby improving diffusivity of a reaction gas. In addition, it may be possible to minimize physical damage to the gas diffusion layer 300 or the membrane electrode assembly 400 by alleviating excessive stress concentration on a reaction surface, thereby improving durability of a fuel cell stack.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A porous separator for a fuel cell, comprising:
   a flow field plate having a first contact portion in contact with a gas diffusion layer or a membrane electrode assembly, a second contact portion in contact with a coolant channel, and a connection portion connected between the first contact portion and the second contact portion; and
   a passage aperture formed in the connection portion,
   wherein a portion of an inside surface of the passage aperture forms a protruding portion protruding toward a center of the passage aperture,
   wherein the protruding portion protrudes toward a centerline from a portion of a first inside surface of the passage aperture when the centerline is extended in a longitudinal direction of the passage aperture to pass opposing midway points of the passage aperture in a widthwise direction of the passage aperture,
   wherein the protruding portion is formed on the first inside surface of the passage aperture that is closer to the first contact portion than the second contact portion, and
   wherein the protruding portion is formed to extend toward the gas diffusion layer or the membrane electrode assembly and to be bent at a predetermined inclination angle with respect to a plane where the protruding portion is flush with the gas diffusion layer or the membrane electrode assembly.

2. The porous separator for a fuel cell according to claim 1, wherein the protruding portion that protrudes from the first inside surface of the passage aperture does not reach or extend over the centerline of the passage aperture.

3. The porous separator for a fuel cell according to claim 1, the protruding portion is formed in a middle portion of the first inside surface of the passage aperture.

4. The porous separator for a fuel cell according to claim 1, wherein the protruding portion is formed to extend over a full length of the first inside surface of the passage aperture.

5. The porous separator for a fuel cell according to claim 1, wherein the protruding portion is in surface contact with an outer surface of the gas diffusion layer or the membrane electrode assembly.

6. The porous separator for a fuel cell according to claim 1, wherein the predetermined inclination angle between the protruding portion and the plane is in a range of from about 1° to 45°.

7. The porous separator for a fuel cell according to claim 1, wherein bending stiffness of the protruding portion is weaker than compressive stiffness of the gas diffusion layer and the membrane electrode assembly, the protruding portion is bent by pressing force of the gas diffusion layer or the membrane electrode assembly in a direction in which the predetermined inclination angle with respect to the plane is decreased when a fuel cell stack is assembled, and the protruding portion comes into surface contact with the outer surface of the gas diffusion layer or the membrane electrode assembly.

8. The porous separator for a fuel cell according to claim 1, wherein an end portion of the protruding portion is formed to rise toward a coolant channel from an outer surface of the gas diffusion layer or the membrane electrode assembly, and a retention space for retaining water therein is formed in a portion thereof connected to the first contact portion and the connection portion.

9. The porous separator for a fuel cell according to claim 8, wherein an end of the protruding portion is connected to the first contact portion and the opposite end of the protruding portion is formed to extend in the same direction as the connection portion that is formed to rise toward the second contact portion.

10. The porous separator for a fuel cell according to claim 1, wherein the protruding portion is formed in a second inside surface of the passage aperture that is closer to the second contact portion than the first contact portion.

* * * * *